F. A. CIGOL.
METHOD OF FORMING ARTICLES OF SHEET RUBBER.
APPLICATION FILED APR. 15, 1915.
1,249,030.  Patented Dec. 4, 1917.
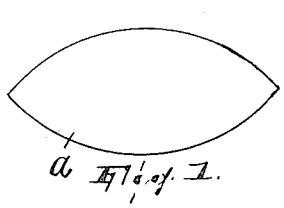
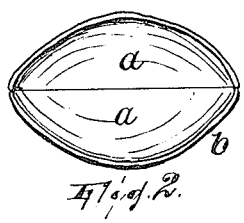
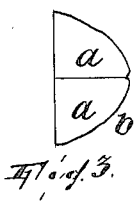
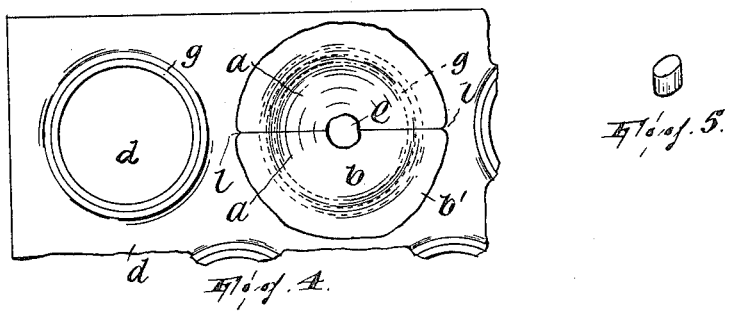
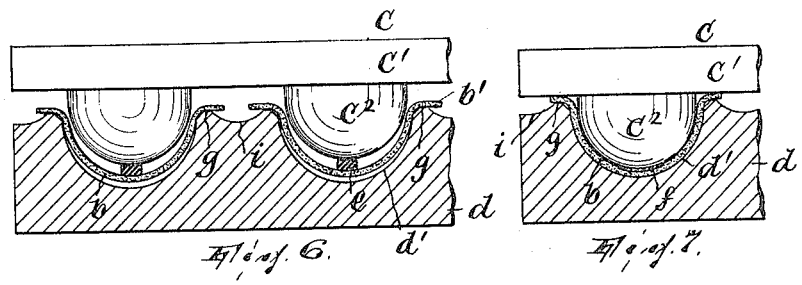
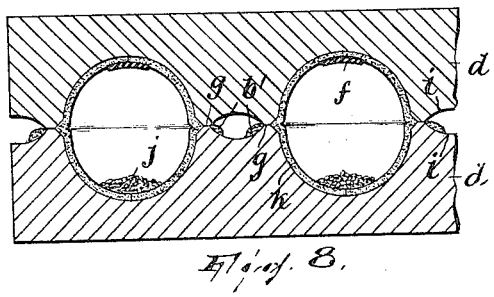
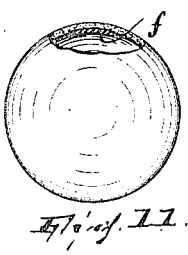
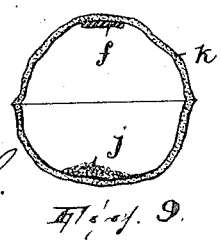
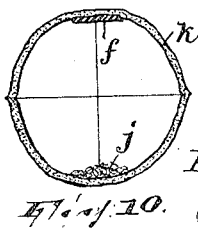
WITNESS
Wm Bell
INVENTOR,
Frank A. Cigol
BY
ATTORNEY.

UNITED STATES PATENT OFFICE.

FRANK A. CIGOL, OF LITTLE FALLS, NEW JERSEY.

METHOD OF FORMING ARTICLES OF SHEET-RUBBER.

1,249,030.  Specification of Letters Patent.  Patented Dec. 4, 1917.

Application filed April 15, 1915. Serial No. 21,536.

*To all whom it may concern:*

Be it known that I, FRANK A. CIGOL, a citizen of the United States, residing at Little Falls, in the county of Passaic and State of New Jersey, have invented certain new and useful Improvements in Methods of Forming Articles of Sheet-Rubber, of which the following is a specification.

Hollow balls and the like articles of rubber are at present made by edge-joining elliptical pieces or quarters of sheet rubber to form halves, then edge-joining the halves to form hollow bodies, and then, having first introduced into each hollow body before finally sealing it up a quantity of a gas-forming substance, vulcanizing the same, the expanding pressure of the gas generated by the vulcanizing heat serving to shape each body to the form of the vulcanizing mold. This method is tedious and slow and the product thereof frequently defective and misshapen, the edges of the pieces not being properly or at least uniformly joined and malformations being vulcanized into the material because of the non-symmetrical and irregular shapes possessed by the articles in the first instance.

In my application Serial Number 763,985 I proposed an improvement wherein first two sheets of rubber were pressure-molded into a number of hemispherical protuberances or hemispheres, then, having placed the gas-forming substance in the thus-formed hollows of one sheet, the other sheet, inverted, was placed upon the first with their hollows in registry, and then by dies pressure was applied continuously around each pair of opposed hollows or hemispheres sufficient to cut them out and leave them adhering together as spheres. This method has this drawback: that on account of the hemispheres being integral parts of a sheet when pressure-molded they tend to return to the planiform shape as soon as released from the mold, so that frequently by the time they are joined to their complements in the cutting operation of the aforesaid dies to form spheres they are unduly shallow and the "spheres" in consequence flattened and hence so reduced in cubical content that if vulcanized in that state the expansion of the gas in the vulcanizing would rupture their seams; wherefore the inflation thereof by air to approximately the shape of the vulcanizing molds before their introduction thereto is in practice usually found necessary.

According to my present invention, natural sheet-rubber halves are first formed, then one or each of these is pressure-molded into a concavo-convex body having a continuous marginal flange, then the two halves are placed face to face, and then squeezing pressure is exerted on the marginal portions of the two halves continuously thereof and the halves thus joined by adhesion and their edge-portions cut away. Preferably, one or each of said halves is formed in initially concavo-convex shape by edge-joining sheet rubber pieces (elliptical, if the article to be produced is to be a ball). Stretching of the material in the molding operation, with the consequent contraction that follows as soon as the mold-pressure is removed, is avoided in this way, so that when the joining of the two halves has been effected the resultant body so nearly approximates the vulcanizing mold in cubical content that inflation is unnecessary.

Where the article to be ultimately produced, such as a ball, is to be inflated by air or gas to give it "life" I place in one of the halves before the pressure-molding thereof a plastic rubber piece which becomes flattened out into the form of a plaster when the pressure-molding is effected. Through this plaster, which is self healing, the air or gas may be introduced, as the final step in making a "live" ball, by puncturing with a suitable inflating device.

Referring, now, to the accompanying drawing, in which my invention is fully illustrated, Figure 1 shows one of the ellipses of sheet rubber employed in forming each half;

Figs. 2 and 3 are an inside and an end elevation of one of the halves;

Fig. 4 shows one of the halves on the female member of the pressure-mold;

Fig. 5 shows the plastic rubber piece;

Figs. 6 and 7 show the pressure-mold parts and rubber halves therein in section and before and after molding, respectively;

Fig. 8 shows in section the dies and rubber halves after the dies have cut away the edge portions of the latter and left the halves adhering together or sealed;

Figs. 9 and 10 are sectional views of the article formed as in Fig. 8; and,

Fig. 11 shows, partly in section, the article after it has been vulcanized.

Describing my invention in its preferred form and with reference particularly to the manufacture of hollow rubber balls, I first prepare from unvulcanized sheet rubber elliptical pieces $a$, and then edge-join two such pieces to form a concavo-convex half $b$ (Figs. 2 and 3).

Molds are provided each comprising a male member $c$, consisting of a plate $c'$ having a number of hemispherical protuberances on one face thereof and a female member $d$ consisting of another plate having hemispherical recesses $d'$ conforming in number and shape to but being each a trifle larger than the protuberances $c^2$. The diameter of each mold-unit constituted by a protuberance and recess is somewhat less than that of the half $b$ when, in accordance with the next step of the method, said half has been shaped into a definite form by the mold.

A number of the halves $b$ are then by hand pressed into the recesses of one mold member $d$, as shown in Figs. 4 and 6, whereupon the halves are given definite shape by employing the male members $c$ to exert pressure on the halves and force them into the recesses $d'$. In another female mold member which is the counterpart of the mold member $d$ other halves are given definite shape in the same way. If the balls to be ultimately produced are to be "live" balls, before one of the male mold members is made to give definite shape to the halves a piece of plastic rubber $e$ (Fig. 5) is placed in each half, as in Fig. 6, and when the pressure is accomplished this will be flattened out into a plaster $f$ adhering to the inside of the shaped half.

The two female mold members have around each recess thereof a narrow squeezing surface $g$, preferably chamfered next to the recess and outwardly flanked by a continuous shallow scrap recess $i$.

The mold member $d$, with the shaped halves occupying the recesses thereof, is now placed inverted upon the other mold member $d$, having shaped halves occupying its recesses. Before this is done, however, a gas-forming substance $j$ is placed in the half occupying each recess of the lower mold member. The mold members being arranged with their squeezing surfaces $g$ in exact registry with each other, pressure is applied and the edge portions $b'$ of the halves are thus cut away and the halves joined by adhesion, as shown in Fig. 8, leaving the substance $j$ imprisoned.

No appreciable stretching having occurred in the pressure-molding operation, because each half was entirely independent of the others and because it was concavo-convex although irregular in form when fitted into the recess of a female mold member $d$, no material contraction resulted upon removal of the male mold member after the pressure-molding. Consequently, the product $k$ of the coaction of the two female members $d$ as dies has approximately the same cubical content as the space formed by the two recesses of the dies. (See Figs. 9 and 10, where the product of the dies is shown somewhat enlarged but not appreciably flattened.)

The articles $k$ are now placed in the vulcanizing mold—having approximately the same cubical content as the space formed by each two counterpart recesses of the dies—and vulcanized, the gas generated from the substance $j$ by the heat pressing the wall of the article outwardly uniformly against the wall of the mold until the vulcanizing is completed and the material has set. The product will be a perfectly spherical hollow object (see Fig. 11).

To give the ball produced the necessary "life," its wall may be punctured through the plaster $f$ by an inflating device which, upon the removal therefrom, will act to seal the puncture.

By my method I avoid one serious difficulty that attaches to the manufacture of balls by the method now practised and first referred to herein: That is to say, at the junctures of the seams (at the ends of the elliptical pieces) a ball made according to the method now practised will always be weak and frequently have a break or opening. The cutting surfaces $g$ of the dies according to my invention are sufficiently less in diameter than the halves $b$ so as to cut well inwardly of the V-shaped recess $l$ which it is difficult always to avoid by the method now practised in edge-joining the elliptical pieces to form the halves.

Having thus fully described my invention, what I claim as new and desire to secure by Letters Patent is:—

1. The hereindescribed method of forming articles of sheet rubber which consists in first preparing a concavo-convex body by edge-joining sheet rubber pieces, then pressure-molding said body into a definite concavo-convex marginally flanged form, then placing face to face said body and another sheet rubber body, and then squeezing together the marginal portions of said bodies continuously thereof and thereby causing them to be joined by adhesion and the edge-portions thereof to be cut away.

2. The hereindescribed method of forming substantially spherical hollow articles of sheet rubber which consists in first edge-joining elliptical pieces of sheet rubber and forming concavo-convex halves, then pressure-molding each half into a marginally flanged hemispherical form, then placing face to face said halves to form a sphere, and then squeezing together the marginal portions of said halves continuously of the flanges thereof and thereby causing them to be joined by adhesion and the edge-portions thereof to be cut away.

3. The hereindescribed method of forming hollow articles of sheet rubber adapted to be inflated which consists in first preparing sheet rubber halves, then placing one of the halves over the recess of a female pressure member, then placing a piece of plastic rubber on said half over the recess, then by a male pressure-member forcing the said half and the rubber piece into said recess and flattening out said piece and pressing the same into adhering relation to said half, and then marginally joining the two halves.

In testimony whereof I affix my signature.

FRANK A. CIGOL.